United States Patent
Li et al.

(10) Patent No.: US 10,126,483 B2
(45) Date of Patent: Nov. 13, 2018

(54) LIGHT GUIDE PLATE ASSEMBLY AND DISPLAY APPARATUS

(71) Applicant: BOE Technology Group Co., Ltd., Beijing (CN)

(72) Inventors: Hui Li, Beijing (CN); Qing Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 182 days.

(21) Appl. No.: 14/913,097

(22) PCT Filed: Aug. 3, 2015

(86) PCT No.: PCT/CN2015/085933
§ 371 (c)(1),
(2) Date: Feb. 19, 2016

(87) PCT Pub. No.: WO2016/141669
PCT Pub. Date: Sep. 15, 2016

(65) Prior Publication Data
US 2017/0045670 A1 Feb. 16, 2017

(30) Foreign Application Priority Data

Mar. 10, 2015 (CN) .......................... 2015 1 0104556

(51) Int. Cl.
*F21V 8/00* (2006.01)
*G02F 1/1335* (2006.01)

(52) U.S. Cl.
CPC ......... *G02B 6/0041* (2013.01); *G02B 6/0053* (2013.01); *G02B 6/0065* (2013.01);
(Continued)

(58) Field of Classification Search
CPC .. G02B 6/0041; G02B 6/0053; G02B 6/0065; G02F 1/1335
See application file for complete search history.

(56) References Cited

U.S. PATENT DOCUMENTS 6,129,439 A * 10/2000 Hou .......................... F21V 5/02
362/23.15
7,530,719 B2 * 5/2009 Yamashita ............. G02B 5/045
362/600
(Continued)

FOREIGN PATENT DOCUMENTS

CN 1683966 A 10/2005
CN 1766704 A 5/2006
(Continued)

OTHER PUBLICATIONS

First Office Action, including Search Report, for Chinese Patent Application No. 201510104556.X, dated Mar. 1, 2017, 10 pages.
(Continued)

*Primary Examiner* — Anabel Ton
(74) *Attorney, Agent, or Firm* — Westman, Champlin & Koehler, P.A.

(57) ABSTRACT

Embodiments of the present invention disclose a light guide plate assembly. The light guide plate assembly includes a light guide plate and an optical coupling member attached to the light guide plate. The optical coupling member includes a plate-like part and a plurality of prism parts formed on the plate-like part. Each of the plurality of prism parts has a planar top surface, the top surface engaging with a light exiting surface of the light guide plate, and each of the plurality of prism parts has a reflective side surface which is configured to reflect incident light towards a light exiting surface of the optical coupling member through total reflection. The present disclosure further discloses a display apparatus including the said light guide plate assembly.

16 Claims, 3 Drawing Sheets

(52) U.S. Cl.
CPC .......... *G02F 1/1335* (2013.01); *G02B 6/0061* (2013.01); *G02F 1/133615* (2013.01)

(56) References Cited

U.S. PATENT DOCUMENTS

| | | | |
|---|---|---|---|
| 7,995,160 B2 * | 8/2011 | Kim | G02B 6/0053 349/64 |
| 2006/0072341 A1 | 4/2006 | Huang et al. | |
| 2010/0296025 A1 * | 11/2010 | Gourlay | G02B 6/0053 349/62 |
| 2014/0140091 A1 * | 5/2014 | Vasylyev | G02B 6/001 362/606 |

FOREIGN PATENT DOCUMENTS

| | | |
|---|---|---|
| CN | 1896831 A | 1/2007 |
| CN | 101661130 A | 3/2010 |
| CN | 104656183 A | 5/2015 |

OTHER PUBLICATIONS

International Search Report and Written Opinion for International Patent Application No. PCT/CN2015/085933, dated Nov. 6, 2015, 9 pages.

English translation of Box No. V from the Written Opinion of the International Search Report for International Patent Application No. PCT/CN2015/085933, 2 pages.

\* cited by examiner

LIGHT GUIDE PLATE ASSEMBLY AND DISPLAY APPARATUS

CROSS-REFERENCE TO RELATED APPLICATION

This application is a national phase application of international application PCT/CN2015/085933 filed on Aug. 3, 2015 and claims the benefit of Chinese Patent Application No. 201510104556.X filed on Mar. 10, 2015 in the State Intellectual Property Office of China, the whole disclosure of which is incorporated herein by reference.

BACKGROUND OF THE INVENTION

Field of the Invention

The present disclosure relates to a field of display technology, and in particular, to a light guide plate assembly and a display apparatus comprising such a light guide plate assembly.

Description of the Related Art

At present, a liquid crystal display apparatus generally employs backlight illumination. There are mainly three types of backlight illuminations, i.e., an edge-type backlight illumination, a direct-type backlight illumination and a mixed-type backlight illumination. Currently, the liquid crystal display apparatus employing the edge-type backlight illumination is dominating the market because it has a low cost and facilitates to obtain a light and thin liquid crystal display panel. However, the edge-type backlight illumination typically has a defect of low light distribution effect, in particular in a case where a LED lamp emits linearly polarized light. In such a case, it mainly depends on a light distribution effect of the light guide plate itself.

A common light guide plate includes a scattering dot type light guide plate (as shown in FIG. 1) and a refractive micro groove type light guide plate (as shown in FIG. 2).

FIG. 1 shows a schematic light path diagram of the scattering dot type light guide plate. As shown, the scattering dot type light guide plate 3 typically has a plurality of scattering dots arranged dispersedly therein. When light beams emitted from a light source 1 irradiate onto the scattering dots, the light beams are scattered towards various directions, and a portion of the light beams return to the light guide plate 3 by a reflective plate 2 and then are scattered by the scattering dots again. The scattered light beams exit from an upper surface of the light guide plate so as to provide a backlight illumination.

FIG. 2 shows a schematic light path diagram of the refractive micro groove type light guide plate. As shown, the refractive micro groove type light guide plate 3' typically has a plurality of micro grooves arranged in its lower surface. The grooves are configured to refract and reflect light beams when they irradiate onto side walls of the grooves. The refracted light beams irradiate onto a reflective plate 2 to be reflected into the light guide plate 3', varies its direction by refraction, then exit from an upper surface of the light guide plate 3', so as to provide a backlight illumination.

However, as for the scattering dot type light guide plate, the scattering dots enable incident light to be scattered in different directions. The scattered light wave will undergo different phase changes and propagates towards different directions. Thus, a depolarization phenomenon will inevitably occur to the scattered light. As for the refractive micro groove type light guide plate, though its polarization efficiency is slightly higher than the scattering dot type light guide plate, there is also a depolarization problem to some extent caused by deviated light paths and a polarization rotation effect still existing in a Y-Z plane in which the light is propagated.

SUMMARY OF THE INVENTION

An object of the present disclosure is to provide a novel light guide plate assembly, which is capable of addressing the above technical problems in the prior art at least partially.

According to an aspect of the present disclosure, a light guide plate assembly is provided. The light guide plate assembly comprises a light guide plate and an optical coupling member attached to the light guide plate, wherein the optical coupling member comprises a plate-like part and a plurality of prism parts formed on the plate-like part. Each of the plurality of prism parts has a planar top surface, the top surface engaging with a light exiting surface of the light guide plate, and each of the plurality of prism parts has a reflective side surface which is configured to reflect incident light incoming from the top surface towards a light exiting surface of the optical coupling member through total reflection.

According to an exemplary embodiment of the present disclosure, the plurality of prism parts are parallel to each other in an extending direction of the plate-like part.

According to another exemplary embodiment of the present disclosure, a cross section of each of the plurality of prism parts perpendicular to the extending direction is in a quadrangle shape.

According to another exemplary embodiment of the present disclosure, the cross section is in a parallelogram shape.

According to another exemplary embodiment of the present disclosure, the light guide plate and the optical coupling member are formed from materials having the same or similar refractive indexes, and spaces between adjacent prism parts are filled with air or vacuum.

According to another exemplary embodiment of the present disclosure, the refractive indexes of materials, from which the light guide plate and the optical coupling member are formed, are greater than or equal to 1.4.

According to another exemplary embodiment of the present disclosure, the refractive indexes of materials, from which the light guide plate and the optical coupling member are formed, are close to 1.5.

According to another exemplary embodiment of the present disclosure, the reflective side surface of each of the plurality of prism parts is configured to be inclined towards a light incoming side of the light guide plate.

According to another exemplary embodiment of the present disclosure, the reflective side surfaces of the plurality of prism parts have respective inclinations which are decreased gradually from the light incoming side of the light guide plate.

According to another exemplary embodiment of the present disclosure, the optical coupling member comprises four prism parts, and an angle between the reflective side surface of the first prism part and the light exiting surface of the light guide plate is in a range of 40 to 50 degrees, an angle between the reflective side surface of the second prism part and the light exiting surface of the light guide plate is in a range of 55 to 65 degrees, an angle between the reflective side surface of the third prism part and the light exiting surface of the light guide plate is in a range of 70 to 80 degrees, and an angle between the reflective side surface of the fourth prism part and the light exiting surface of the light guide plate is in a range of 85 to 90 degrees.

According to another exemplary embodiment of the present disclosure, the angle between the reflective side surface of the first prism part and the light exiting surface of the light guide plate is 45 degrees, the angle between the reflective side surface of the second prism part and the light exiting surface of the light guide plate is 60 degrees, the angle between the reflective side surface of the third prism part and the light exiting surface of the light guide plate is 75 degrees, and the angle between the reflective side surface of the fourth prism part and the light exiting surface of the light guide plate is 90 degrees.

According to another aspect of the present disclosure, it is provided a display apparatus comprising the aforementioned light guide plate.

By using the light guide assembly of the present disclosure, a utilization ratio of light can be increased, a brightness of the display can be increased and a uniformity of the backlight illumination can be also increased. By using the light guide assembly of the present disclosure, it is not necessary to provide an additional brightness enhancement film and complex nanometer grating material in the conventional light guide plate.

In addition, by using the light guide assembly of the present disclosure, the depolarization during the propagation of the light can be avoided through total reflection. Compared with the conventional scattering dot type light guide plate, the depolarization phenomenon of the light can be avoided. Meanwhile, compared with the conventional refractive micro groove type light guide plate, it is able to provide more complex and diverse light paths, so as to make the brightness of the backlight illumination more uniform.

DETAILED DESCRIPTION OF PREFERRED EMBODIMENTS OF THE INVENTION

Figure 1:
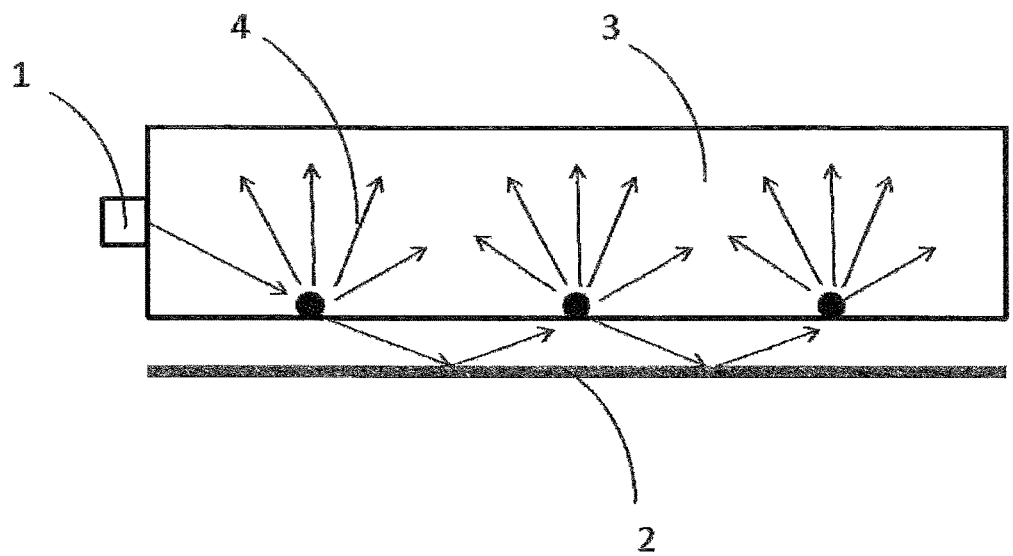
FIG. 1 shows a schematic light path diagram of a scattering dot type light guide plate in the prior art.
Figure 2:
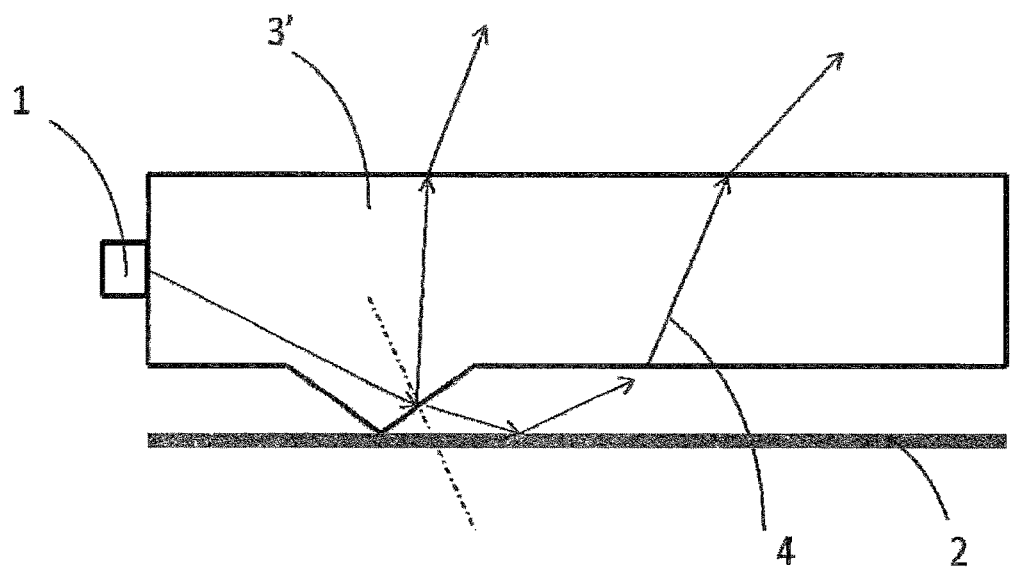
FIG. 2 shows a schematic light path diagram of a refractive micro groove type light guide plate in the prior art.

The objects, technical solutions and advantages of the present invention will become more clear and apparent by further explaining the present invention with reference to the embodiments and drawings below.

Before further explaining any embodiment in detail, it should be noted that the present invention is not limited to the configuration details provided in the following descriptions or illustrated in the following drawings and the component arrangements. The present invention may be implemented in other implementations or other forms.

The exemplary embodiments described in the detailed implementations and illustrated in the drawings are intended to teach the principle of the present invention, so as to enable those skilled in the art to implement and use the present invention. Thus, the exemplary embodiments should not be considered as limiting the scope of the present invention. It should be further noted that the drawings are merely illustrative and not drawn to scale, and elements having similar structures or functions are indicated by the same or similar reference numerals in these drawings. In addition, the words "upper", "lower", "left", "right" and the like used to indicate orientations herein are only used to denote the situation illustrated in the drawings, and they are merely intended to facilitate explaining the present invention, but not to limit the present invention.

Figure 3:
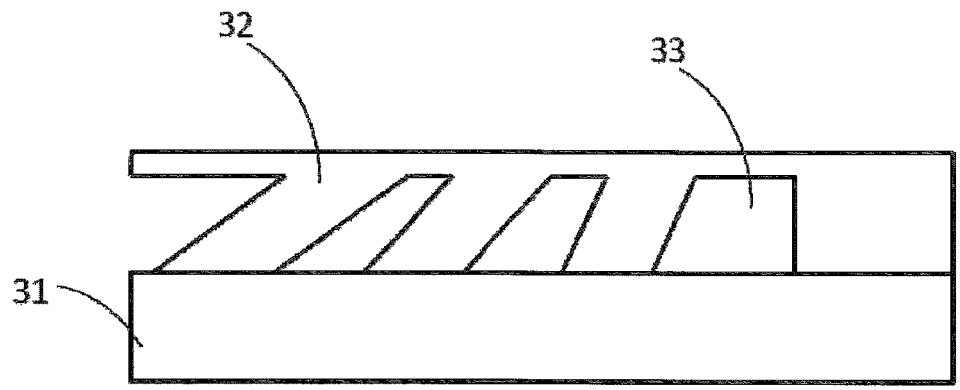
FIG. 3 shows a schematic structural view of a light guide plate assembly according to an embodiment of the present invention.
Figure 4:
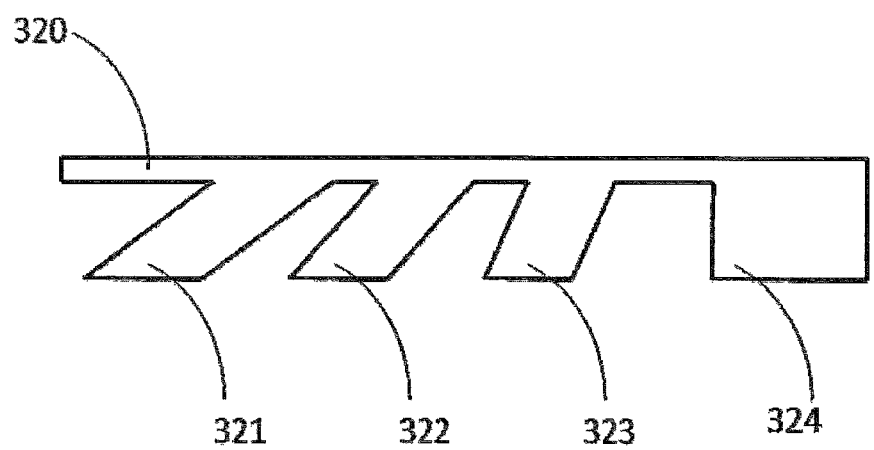
FIG. 4 shows a schematic structural view of an optical coupling member of the light guide plate assembly in FIG. 3.

FIG. 3 shows a schematic structural view of a light guide plate assembly according to an embodiment of the present invention. FIG. 4 shows a schematic structural view of an optical coupling member of the light guide plate assembly in FIG. 3. As shown in FIG. 3, the light guide plate assembly comprises a light guide plate 31 and an optical coupling member 32 attached to an upper surface of the light guide plate 31. As shown in FIG. 4, the optical coupling member 32 comprises a plate-like part 320 and a plurality of prism parts 321, 322, 323, 324 which project from the plate-like part and are spaced apart from each other. According to the embodiment, the plurality of prism parts 321, 322, 323, 324 are formed on the plate-like part 320 integrally. As shown in FIG. 4, the optical coupling member 32 comprises the plate-like part 320 and the plurality of prism parts 321, 322, 323, 324 (for example, four, as shown in FIG. 4) formed on a lower surface of the plate-like part 320. It can be seen from FIGS. 3 and 4 that each of the prism parts 321, 322, 323, 324 has a planar top surface. The optical coupling member 32 is coupled to an upper surface (light exiting surface) of the light guide plate 31 through the top surfaces of the plurality of prism parts 321, 322, 323 and 324. The plurality of prism parts 321, 322, 323 and 324 are arranged in order from the left side of the light guide plate 31.

In the present disclosure, each of the prism parts has a reflective side surface which is configured to be able to reflect incident light incoming from the top surface towards a light exiting surface of the optical coupling member through total reflection, so that each of the prism parts is able to reflect a part of light and the light is emitted from different portions of plate-like part of the optical coupling member, a light-emitting uniformity of the light guide plate assembly is thus increased. It will be realized by the specific structure described in detail hereinafter, for example.

In an implementation, as shown in FIGS. 3 and 4, the cross section of at least one of the plurality of prism parts 321, 322, 323 and 324 is in a quadrangular shape inclined towards the left side of the light guide plate 31, and the cross section of the prism part 324 is in a rectangle shape. Thus, at least one of two sides of each quadrangle can be used as the reflective side surface.

Figure 5:
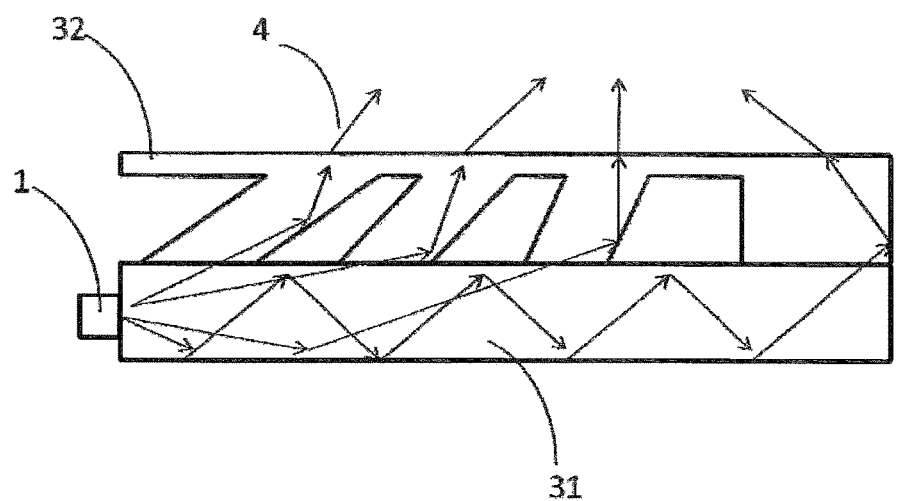
FIG. 5 shows a schematic light path diagram of the light guide plate assembly in FIG. 3.

In a case where the edge-type backlight illumination is applied, a light source 1 may be provided at the left side of the light guide plate 31, as shown in FIG. 5. In other words, the plurality of prism parts 321, 322 and 323 are inclined towards a light incoming side of the light guide plate. It should be noted that the so-called expression that "the prism parts are inclined towards a light incoming side of the light guide plate" is meant that end portions of the prism parts are inclined towards the light incoming side of the light guide plate with respect to base portions of the prism parts connected to the plate-like part.

According to an example, the plurality of prism parts extend parallel to each other on the plate-like part of the optical coupling member. For example, as shown in FIG. 4, the plurality of prism parts extend in a direction perpendicular to the surface of paper. Thus, the optical coupling member has a simple and orderly shape, which is easy to be designed and manufactured. Of course, in order to meet requirements of various backlight illumination forms, each prism part may be designed independently according to a specific requirement.

As an alternative, a cross section of each of the prism parts perpendicular to the extending direction of the prism parts is in a parallelogram shape. In another example, the cross section of each of the prism parts may be in a trapezoid shape which has a larger width at an end adjacent to the plate-like part 320. Such a configuration may facilitate to manufacture the optical coupling member.

As shown in FIGS. 3 and 4, the plurality of prism parts 321, 322, 323, 324 are inclined towards the light incoming side of the light guide plate by inclinations gradually decreased from the left side of the light guide plate. In an exemplary embodiment, the cross section of each of the plurality of prism parts 321, 322, 323, 324 is in a parallelogram shape. Thus, the reflective side surfaces of the prism parts are inclined towards the light incoming side of the light guide plate by inclinations which are gradually decreased.

In an embodiment, an angle between the reflective side surface of the first prism part 321 and the upper surface (i.e. the light exiting surface of the light guide plate 31, in the embodiment) of the light guide plate 31 is in a range of 40 to 50 degrees, an angle between the reflective side surface of the second prism part 322 and the upper surface of the light guide plate 31 is in a range of 55 to 65 degrees, an angle between the reflective side surface of the third prism part 323 and the upper surface of the light guide plate 31 is in a range of 70 to 80 degrees, and an angle between the reflective side surface of the fourth prism part 324 and the upper surface of the light guide plate 31 is in a range of 85 to 90 degrees.

In a further embodiment, the angle between the reflective side surface of the first prism part 321 and the upper surface of the light guide plate 31 is 45 degrees, the angle between the reflective side surface of the second prism part 322 and the upper surface of the light guide plate 31 is 60 degrees, the angle between the reflective side surface of the third prism part 323 and the upper surface of the light guide plate 31 is 75 degrees, and the angle between the reflective side surface of the fourth prism part 324 and the upper surface of the light guide plate 31 is 90 degrees.

It should be noted that, though the optical coupling member has four prism parts in the illustrated embodiment, more or less prism parts may be provided depending on the lateral widths of the light guide plate and the optical coupling member, correspondingly, inclinations of the respective prism parts may also be changed and adjusted depending on the number of the prism parts. Specially, the differences between inclinations of adjacent prism parts may be substantially the same.

The light guide plate 31 and the optical coupling member 32 are formed from materials having the same or similar refractive indexes, so as to allow light to enter the optical coupling member 32 from the light guide plate 31 smoothly. If there is a large difference in refractive index between the material of the light guide plate 31 and the material of the optical coupling member 32, the light may be totally reflected at an interface surface therebetween so that the light is not easy to enter the optical coupling member 32 from the light guide plate 31. Further, spaces 33 between adjacent prism parts may be filled with air or vacuum. As the air or the vacuum has a low refractive index, the light may be totally reflected when the light irradiates on the interface surface between the space 33 and the light guide plate 31, so that the light will return into the light guide plate 31 completely and will be reused as light source, for example, through the reflection of a reflective plate 2.

In an implementation, the light guide plate 31 and the optical coupling member 32 may be further configured such that a total reflection occurs when the light enters the light guide plate 31, for example from its left side, then irradiates on the interface surface between the space 33 and the light guide plate 31.

To this end, and in order to increase the chance of occurrence of total reflection, both the light guide plate 31 and the optical coupling member 32 may be formed from the materials having a high refractive index. It can be known from total reflection formula know in the art that, the larger the ratio of the refractive index of the optically denser medium to the refractive index of the optically thinner medium is, the larger the critical angle at which the total reflection occurs is, that is, more easily the total reflection occurs. Thus, in an example, in the case where the spaces 33 are filled with air or vacuum, the refractive indexes of the light guide plate 31 and the optical coupling member 32 are above 1.4. In an example, both the light guide plate 31 and the optical coupling member 32 are formed from polymethyl methacrylate (PMMA) or polycarbonate (PC) which both have refractive indexes of about 1.5. The light guide plate 31 and the optical coupling member 32 may be formed from the same material or different materials. The material, from which the light guide plate and the optical coupling member are made, may also be selected depending on actual situations, for example, according to the number of the prism parts on the optical coupling member, the inclined angles of the prism parts and the like.

FIG. 5 shows a schematic light path diagram of the light guide plate assembly in FIG. 3. As shown, the light from the light source 1 enters the light guide plate 31. Since the light from the light source 1 enters the light guide plate in different directions, according to the embodiment, as the plurality of prism parts 321, 322, 323 and 324 are arranged obliquely, the light is possible to enter the prism parts of the optical coupling member directly through the light guide plate from the light source. Thus, portions of light may enter the prism parts of the optical coupling member 32 from the light guide plate 31 directly and may exit from the upper surface of the optical coupling member 32 through a reflection of the reflective side surface of the prism part. In addition, a part of the light may be subjected to multiple reflections in the light guide plate 31, then may finally enter the prism parts of the optical coupling member 32, and exit from the upper surface of the optical coupling member 32.

In the above embodiment, all the light can enter the prism parts of the optical coupling member through different light paths, thus there is no loss of light. Moreover, the light entering the prism parts of the optical coupling member is totally reflected on the reflective side surfaces of the prism parts to irradiate onto the light exiting surface of the optical coupling member and exit from the light exiting surface of the optical coupling member. Compared to the scattering in the prior art, the total reflection is able to keep a high polarization efficiency of light, thereby eliminating the light depolarization phenomenon of the scattering dot type light guide plate in the prior art. Meanwhile, compared to the refractive micro groove type light guide plate, it is able to provide more complex and diverse light paths, so that the brightness of backlight illumination is more uniform.

Figure 6:
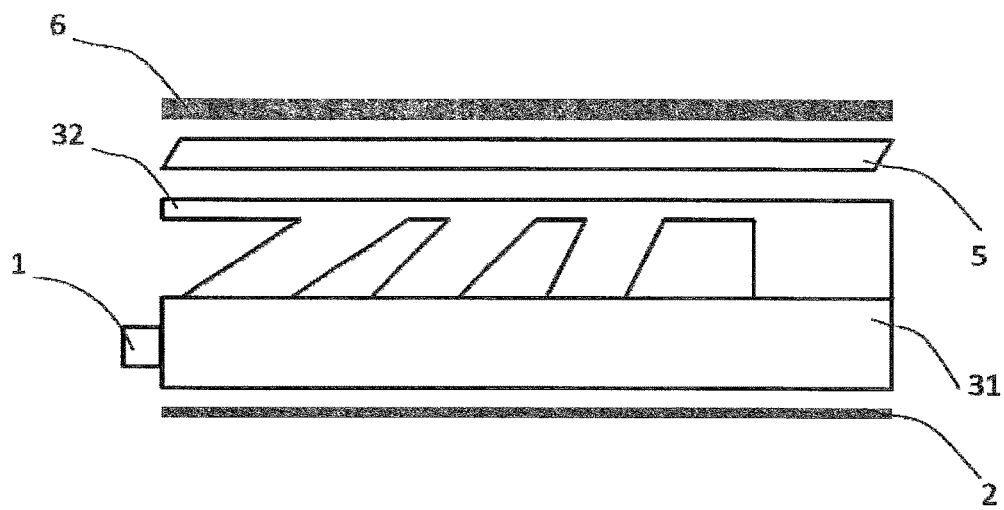
FIG. 6 shows a schematic structural view of a display apparatus according to an embodiment of the present invention, comprising the light guide plate assembly in FIG. 3.

FIG. 6 shows a schematic structural view of a display apparatus according to an embodiment of the present invention. The display apparatus comprises a backlight system, a liquid crystal display 5 and an upper polarizer 6. The backlight system comprises a light source 1 such as a lamp emitting linearly polarized light, the light guide plate assembly, as mentioned above, comprising the light guide plate 31 and the optical coupling member 32, and a reflective plate 2.

Hereto, preferred embodiments of the present disclosure have been described in detail by means of examples, however, those skilled in the art will appreciate that further modifications and changes may be made without departing from the spirit of the present disclosure, and these modifications and changes should fall into the scope of the present invention. Thus, the scope of the present invention should be subject to the scope of the appended claims.

What is claimed is:

1. A light guide plate assembly comprising:
a light guide plate having a light exiting surface; and
an optical coupling member attached to the light exiting surface of the light guide plate,
wherein the optical coupling member comprising:
a plate-like part, and
a plurality of prism parts projected from the plate-like part, and
wherein each of the plurality of prism parts has a planar top surface located away from the plate-like part and engaging with the light exiting surface of the light guide plate, and each of the plurality of prism parts has a reflective side surface which is configured to reflect incident light incoming from the top surface towards a light exiting surface of the optical coupling member through total reflection,
wherein the reflective side surface of each of the plurality of prism parts is configured to be inclined towards a light incoming side of the light guide plate, and
wherein the reflective side surfaces of the plurality of prism parts have inclinations which are decreased gradually from the light incoming side of the light guide plate.

2. The light guide plate assembly according to claim 1, wherein the plurality of prism parts extend parallel to each other on the plate-like part.

3. The light guide plate assembly according to claim 2, wherein a cross section of each of the plurality of prism parts perpendicular to an extending direction of the plate-like part is in a quadrangle shape.

4. The light guide plate assembly according to claim 3, wherein the cross section is in a parallelogram shape.

5. The light guide plate assembly according to claim 1, wherein the light guide plate and the optical coupling member are formed from materials having the same or similar refractive indexes, and spaces between adjacent prism parts are filled with air or vacuum.

6. The light guide plate assembly according to claim 5, wherein the refractive indexes of the materials, from which the light guide plate and the optical coupling member are formed, are greater than or equal to 1.4.

7. The light guide plate assembly according to claim 6, wherein the refractive indexes of the materials, from which the light guide plate and the optical coupling member are formed, are about 1.5.

8. The light guide plate assembly according to claim 1, wherein the optical coupling member comprises four prism parts, and an angle between the reflective side surface of the first prism part and the light exiting surface of the light guide plate is in a range of 40 to 50 degrees, an angle between the reflective side surface of the second prism part and the light exiting surface of the light guide plate is in a range of 55 to 65 degrees, an angle between the reflective side surface of the third prism part and the light exiting surface of the light guide plate is in a range of 70 to 80 degrees, and an angle between the reflective side surface of the fourth prism part and the light exiting surface of the light guide plate is in a range of 85 to 90 degrees.

9. The light guide plate assembly according to claim 8, wherein the angle between the reflective side surface of the first prism part and the light exiting surface of the light guide plate is 45 degrees, the angle between the reflective side surface of the second prism part and the light exiting surface of the light guide plate is 60 degrees, the angle between the reflective side surface of the third prism part and the light exiting surface of the light guide plate is 75 degrees, and the angle between the reflective side surface of the fourth prism part and the light exiting surface of the light guide plate is 90 degrees.

10. A display apparatus comprising the light guide plate assembly of claim 1.

11. The display apparatus according to claim 10, wherein the plurality of prism parts extend parallel to each other on the plate-like part.

12. The light guide plate assembly according to claim 11, wherein a cross section of each of the plurality of prism parts perpendicular to an extending direction of the plate-like part is in a quadrangle shape.

13. The light guide plate assembly according to claim 12, wherein the cross section is in a parallelogram shape.

14. The light guide plate assembly according to claim 10, wherein the light guide plate and the optical coupling member are formed from materials having the same or similar refractive indexes, and spaces between adjacent prism parts are filled with air or vacuum.

15. The light guide plate assembly according to claim 14, wherein the refractive indexes of the materials, from which the light guide plate and the optical coupling member are formed, are greater than or equal to 1.4.

16. The light guide plate assembly according to claim 15, wherein the refractive indexes of the materials, from which the light guide plate and the optical coupling member are formed, are about 1.5.

* * * * *